United States Patent Office 2,877,204
Patented Mar. 10, 1959

2,877,204

FLAME RESISTANT POLYESTER COMPOSITION CONTAINING A HALOGENATED PHOSPHONATE

George Bliss Duhnkrack, Harrison, and Charles Hosea Dugliss, Yorktown Heights, N. Y., assignors to American Cyanamid Company, New York, N. Y., a corporation of Maine No Drawing. Application June 1, 1956
Serial No. 588,620

13 Claims. (Cl. 260—45.4)

The present invention relates to novel polymerizable mixtures capable of forming flame-retardant hardened resins and also to the novel polymerization products obtained therefrom.

Liquid thermosetting resin compositions of the unsaturated polyester type, as typified by a mixture of a linear propylene glycol maleate-phthalate polyester with monomeric styrene as a cross-linking agent, are widely used in many fields. Unfortunately, such resins are combustible even when filled or reinforced with considerable percentages of noncombustible materials. This has hampered their use considerably in structural and decorative applications due to considerations of safety, increased insurance rates, and building code requirements. Accordingly, there is a distinct need for improved fire-resistant polyester resins. Various additives have been used to reduce this fire hazard without undue sacrifice of physical properties with limited success, especially in the case of light-transmitting or of opaque light-colored resin formulations.

An object of the invention is to provide improved heat-convertible liquid resin compositions capable of copolymerizing into flame-retardant, infusible and insoluble resins.

Another object of the invention is to provide improved flame-retardant, infusible and insoluble resins.

A further object of the invention is to provide improved liquid thermosetting polyester resin compositions which may be converted into light-colored or light-transmitting solid resins which are resistant to combustion and to discoloration from ultraviolet light.

Still another object of the invention is to provide improved light-colored and light-transmitting hardened polyester resins which are resistant both to fire and to yellowing upon exposure to ultraviolet light.

Other objects and advantages of the invention will be apparent to those skilled in the art upon consideration of the detailed disclosure hereinbelow.

It has been discovered that certain halogenated saturated phosphonates may be incorporated in typical unsaturated polyester compositions to render their polymerization products flame resistant to the point where they are self-extinguishing. Cured polyester resin compositions, in general, are subject to yellowing upon prolonged exposure to sunlight or other ultraviolet radiation. This is, of course, usually objectionable in transparent, translucent and light-colored opaque resin articles. While this deficiency can be corrected or at least minimized by incorporating agents capable of absorbing ultraviolet light in resin formulations; these ultraviolet absorbers have been relatively ineffective in stabilizing polyester resins containing halogen compounds. In the case of the present compositions the halogenated phosphonate produces a surprising synergistic effect in combination with the ultraviolet light-absorbing agent which renders the light absorber far more effective than it is with halogen-free polyester compositions.

The present invention accordingly comprises heat-convertible liquid resin compositions containing one or more unsaturated esters of a polyhydric alcohol and an ethylenically unsaturated polycarboxylic acid, one or more copolymerizable monomeric compounds containing a $CH_2=C<$ group and one or more phosphonates having the structural formula:

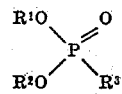

wherein $R^1$ and $R^2$ each represents a hydrocarbon radical and $R^3$ is a radical of the group consisting of monohalogenated and dihalogenated methyl radicals. Narrower aspects of the invention relate to preferred constituents and proportions.

In the above formula for phosphonate compounds, $R^1$ and $R^2$ each denotes the same or different hydrocarbons selected from the group consisting of alkyl, cycloalkyl, aralkyl and aryl radicals containing any available number of carbon atoms, as for instance, 24 or more carbons. Thus $R^1$ may be a methyl group while $R^2$ is a cresyl group or both may be cyclohexyl radicals. A few of the many suitable substituents are methyl, ethyl, isopropyl, tert-butyl, nonyl dodecyl, hexadecyl, octadecyl, etc., alkyl radicals; tolyl, benzyl, xylyl, phenylethyl, phenylpropyl, propylphenyl, diphenyl, naphthyl and anthracyl, etc., aryl and aralkyl radicals; cyclohexyl, cyclopentylmethyl, cyclohexyl, ethylcyclohexyl, ethylcyclopentyl, cyclohexylethyl and cyclopentylmethyl, etc., cycloalkyl radicals. For most purposes, lower alkyl substituents containing about 1 to about 4 carbon atoms are preferred as these appear to provide the optimum results. $R^3$ in the above formula is a methyl radical substituted with either one or two halogen atoms, and these may be the same or different halogen atoms in the case of a dihalogenated methyl radical. The halogen substituents may be chlorine, bromine, iodine or fluorine. From a standpoint of economy, the first two halogens are preferred, especially in light-colored resin formulations, since organic compounds containing iodine often have a tendency to produce discoloration. These organo-phosphorus compounds are clear liquids with boiling points well above 60° C. which is regarded as a minimum practical limit for components of polyester resinous mixtures.

In general, the novel resinous compositions may contain between about 1 and about 40 parts by weight of the phosphonate per 100 parts of total polymerizable matter, that is the total weights of the polyesters plus copolymerizable monomers described hereinbelow, and the preferred content is between about 5 and about 20 parts on the same basis.

Among the specific phosphonates suitable for use in the present compositions are dimethyl iodomethyl phosphonate, diethyl bromomethyl phosphonate, dipropyl chloromethyl phosphonate, di-isopropyl bromomethyl phosphonate, dibutyl chloromethyl phosphonate, dioctyl dichloromethyl phosphonate, dilauryl dibromomethyl phosphonate, dioctadecyl chlorobromomethyl phosphonate, dicresyl fluorochloromethyl phosphonate, phenyl propyl chloromethyl phosphonate, cyclohexyl ethyl chloromethyl phosphonate, cresyl methyl chloromethyl phosphonate, o-tolyl propyl chloroiodomethyl phosphonate, cyclohexylethyl ethyl iodomethyl phosphonate, dibenzyl bromomethyl phosphonate, ethylcyclopentyl isopropyl chloromethyl phosphonate, and phenylpropyl cyclohexyl dichloromethyl phosphonate.

The phosphonates are prepared by reacting paraformaldehyde or a monohalogenated formaldehyde with phosphorus trichloride at 250–300° C. under pressure, The reaction product

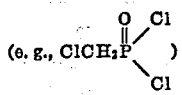
(e. g., $ClCH_2\overset{\overset{O}{\|}}{P}\diagdown_{Cl}^{Cl}$ )

is then reacted with an alcohol or mixture of alcohols either with or without a solvent medium, preferably with heating, to split off the chlorine atoms attached to the phosphorus atom as hydrogen halide. A tertiary amine base such as pyridine or triethylamine is present to remove the hydrogen halide formed as an amine hydrohalide salt.

Although it is contemplated that the sulfur analogs of the above phosphonates, that is, dimethyl chloromethyl thiophosphonate, etc., will produce similar results in unsaturated polyester resin compositions; it is unlikely that the thiophosphonate compounds possess any superiority and problems in their manufacture and use may well arise from the creation of obnoxious odors.

At least one of a wide variety of linear polymeric substances containing reactive nonbenzenoid unsaturation is also a constituent of the novel resinous mixtures. These are well exemplified by the unsaturated linear polyesters of one or more polyhydric alcohols with one or more alpha,beta-ethylenically unsaturated polycarboxylic acids alone or in combination with one or more saturated polycarboxylic acids.

Among the recommended polyhydric alcohols are ethylene glycol, diethylene glycol, propylene glycol, dipropylene glycol, trimethylene glycol, tetramethylene glycol, pinacol, arabitol, xylitol, dulcitol, adonitol, mannitol, glycerol, trimethylol propane, trimethylol ethane, sorbitol, 1,1'-isopropylidene bis(p-phenylenoxy) di-2-propanol, pentaerythritol, dipentaerythritol, and alkanediols as exemplified by butanediol-1,2, butanediol-1,3, butanediol-1,4, pentanediol-1,2, pentanediol-1,4, pentanediol-1,5, hexanediol-1,6, and the like. It is usually desirable that a dihydric alcohol be employed in major proportion relative to any alcohols containing more than two hydroxy groups which may be used in forming the polyester.

The expressions "polycarboxylic acids" and "dicarboxylic acids" are used herein in their broader sense to include available similarly reacting anhydrides such as maleic and phthalic anhydrides. Among the suitable alpha,beta-ethylenically unsaturated acids are maleic, fumaric, aconitic, itaconic, citraconic, mesaconic, chloromaleic, carbic, etc., acids. Substantial amounts of non-polymerizable acids may also be used, but the polymerizable unsaturated acids should be present in an amount approximating at least 5% by weight of the total weight of the polycarboxylic acids used and frequently in amounts varying between about 25% and 65% by weight based on the total weight of polycarboxylic acids present. Examples of such non-polymerizable polycarboxylic acids include phthalic, oxalic, malonic, succinic, glutaric, sebacic, adipic, pimelic, suberic, azelaic, tricarballylic, citric, tartaric and malic acids.

In the preparation of the polymerizable unsaturated polyesters, one may use the polyhydric alcohols and the polycarboxylic acids in substantially equimolar proportions but an excess of alcohol approximating 10 or 15% above the stoichiometric quantity required for complete esterification of the acid is preferred. Where a polyhydric alcohol containing more than two hydroxy groups or a polycarboxylic acid having more than two carboxyl groups is used, the proportions of reactants should be adjusted accordingly to provide for esterification of these additional reactive groups. The alcohol and acid should be reacted sufficiently to produce an ultimate polyester resinous material having an acid number not greater than about 55 and preferably an acid number from about 35 to about 40.

In addition, phosphorus may be combined chemically in the unsaturated linear polyester by coreacting the polyhydric alcohol and polycarboxylic acid with one or more alkyl phosphates in an amount such that the resulting alkyd resin contains from about 0.1 to about 5% of combined phosphorus and preferably between about 0.5 and about 1.5%. Monoalkyl, dialkyl or trialkyl phosphates are suitable, and each alkyl group may contain from 1 to 4 carbon atoms as exemplified by methyl, isopropyl, butyl, and tert-butyl groups. As specific compounds, one may name triethyl phosphate, diethyl phosphate, monopropyl phosphate, to mention only a few.

The well-known thermosetting unsaturated polyester resins and their preparation are disclosed in detail in Ellis Patent No. 2,255,313 and Kropa Patents Nos. 2,443,735 to 2,443,741, inclusive, which are incorporated herein by reference. In addition to the unsaturated alkyd resins, these compositions typically contain a monomeric cross-linking agent such as styrene or diallyl phthalate. The unsaturated polyester content may range from about 10 to about 90% of the total weight of copolymerizable material in the novel flame-retardant compositions depending on the particular qualities desired in the final resin. For the majority of purposes, it is recommended that about 60 to about 80 parts by weight of the unsaturated alkyd resin be dissolved in 40 to 20 parts of polymerizable monomer.

The third component of the new compositions is a cross-linking material comprising one or more monomers containing a $CH_2=C<$ group and having a boiling point above about 60° C. Among the myriad of suitable terminal ethylenic comonomers are: styrene, styrenes with alkyl and halogen substituents on the ring and side chain such as o-, m- and p-methyl styrenes, alpha methyl styrene, 2,4-dimethyl styrene, 2,3-dimethyl styrene, 2,5-dimethyl styrene, alpha chlorostyrene, alpha ethyl styrene, p-ethylstyrene, m-propyl styrene, bromostyrene, dichlorostyrene, isopropenyl toluene, vinyl naphthalene, and the o-, m- and p-chlorostyrenes and bromostyrenes; esters of alpha-methylene aliphatic monocarboxylic acids, such as methyl acrylate, ethyl acrylate, n-butyl acrylate, isobutyl acrylate, dodecyl acrylate, 2-chloroethyl acrylate, 2-chloropropyl acrylate, 2,2'-dichloroisopropyl acrylate, phenyl acrylate, cyclohexyl acrylate, methyl alpha-chloroacrylate, methyl methacrylate, ethyl methacrylate, methyl ethacrylate; acrylonitrile, methacrylonitrile; vinyl esters, such as vinyl acetate, vinyl chloroacetate, vinyl propionate, vinyl butyrate, vinyl laurate, vinyl stearate; vinyl ethers such as vinyl methyl ether, vinyl isobutyl ether, vinyl 2-chlorethyl ether; vinyl ketones, such as vinyl methyl ketone, vinyl hexyl ketone, methyl isopropenyl ketone; isobutylene; vinylidene halides, such as vinylidene chloride, vinylidene chlorofluoride; N-vinyl compounds such as N-vinyl pyrrole, N-vinyl carbazole, N-vinyl indole, N-vinyl succinimide; acrolein, methacrolein, acrylamide, methacrylamide, N-methylol acrylamide; and allyl compounds such as diallyl phthalate, tetrachlorodiallyl phthalate, allyl alcohol, methally alcohol, allyl acetate, allyl methacryate, diallyl carbonate, allyl lactate, allyl alphahydroxyisobutyrate, allyl trichlorosilane, allyl acrylate, diallyl malonate, diallyl oxalate, diallyl gluconate, diallyl methylgluconate, diallyl adipate, diallyl sebacate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl citrate, triallyl cyanurate, triallyl phosphate, trimethallyl phosphate, tetraallyl silane, tetraallyl silicate, hexallyl disiloxane, and the like.

As an optional ingredient of the new resin formulations, an ultraviolet light absorbing agent may be included in an amount ranging from about 0.05 to about 3.0% or more based on the total weight of polymerizable matter, 0.2 to 1.0% being preferred, to eliminate or minimize yellowing in the case of light-transmitting or light-colored products. This additive is unnecessary for dark resin formulations as it contributes in no way to flame resistance in the product. Any light stabilizer compatible with unsaturated polyester resins may be employed and the class of hydroxylated benzophenones, including those containing other substituents, is especially recommended since this group of compounds does not undergo any color change upon absorbing ultraviolet radiation. A few of the many suitable agents are 2,2'-dihydroxy-4-methoxybenzophenone, 2,2'-dihydroxy-4,4'-dimethoxybenzophenone, 2-hydroxy-4-methoxybenzophenone, 2-hydroxy-4'-methoxybenzophenone, 2-hydroxy-4,4'-dimethoxybenzophenone, 2,4-dihydroxybenzophenone, 2-hydroxy-5-salicylylbenzophenone, and like compounds. A wide variety of benzophenones of this type is disclosed in the following patent applications:

Day et al., Serial No. 346,792, filed April 3, 1953
Coleman, Serial No. 458,253, filed Sept. 24, 1954
Hardy et al., Serial No. 522,832, filed July 18, 1955
Forster, Serial No. 526,060, filed August 2, 1955 and Patents Nos. 2,264,291, 2,434,496, 2,455,674, 2,614,940 and 2,659,709.

The conventional additives of the prior polyester resin art are adaptable to use with the novel copolymerizable mixtures and polymerization products of the present invention. Many of these are disclosed in the aforementioned Ellis and Kropa patents and thus need not be set forth here in detail except to mention that such additives include catalysts for curing; promoters for use in conjunction with the catalyst for curing at room or lower temperatures; mold lubricants; fire-retardant agents; fillers and reinforcements like ground asbestos and glass fibers; inhibitors, like hydroquinone, to stabilize the resin mixtures against premature gelation; colorants such as compatible dyes and pigments; and plasticizers. Curing of any of the new liquid resin compositions may be accomplished with or without added pressure in the atmosphere or in closed molds at temperatures ranging from about 10° C. up to 150° C. or even higher temperatures as long as they are kept below the point at which resin degradation commences. Where convenient, it is usually desirable to form the copolymers by heating the catalyzed resin-forming mass to between 90 and about 120° C. for a period of about 10 to 90 minutes. The phosphonates described herein are saturated compounds and do not polymerize or copolymerize in the curing operation, as they are free of nonbenzenoid unsaturation.

The novel cured resins possess the excellent and well-known qualities of polyester resins in general plus greater flame resistance and surprisingly greater stability against discoloration from weathering and ultraviolet light when an ultraviolet absorber is also present. In addition to excellent self-extinguishing characteristics, it also appears that the new polymers are more difficult to ignite than comparable conventional polyesters. During their polymerization, no gases are evolved in the curing operation. Since water-white, transparent products are obtainable, they, of course, may be dyed or pigmented in a limitless variety of shades and hues. In view of their good physical properties, the new resinous compositions have broad utility in many fields including use as coating and film-forming materials, adhesives, binding agents, impregnating agents, molding compositions, laminating and casting resins, and in reinforced plastic articles such as corrugated and flat structural panels.

For a better understanding of the nature and objects of this invention, reference should be had to the accompanying illustrative examples in which all proportions are set forth in terms of weight unless otherwise stated therein.

EXAMPLE 1

An unsaturated polyester is prepared in conventional manner by condensing the following substances:

|  | Mols |
|---|---|
| Propylene glycol | 6.6 |
| Phthalic anhydride | 3.0 |
| Maleic anhydride | 3.0 |

A resin syrup is formulated by blending the following constituents into a homogeneous mixture with thorough stirring:

|  | Parts by weight |
|---|---|
| Unsaturated polyester resin | 71 |
| Monomeric styrene | 29 |
| Dipropyl chloromethyl phosphonate | 10 |
| 2-hydroxy-4-methoxybenzophenone | 0.25 |
| Hydroquinone | 0.008 |

Castings of 1/8" thickness are made by mixing 0.5% benzoyl peroxide into the syrup as a catalyst and then heating the catalyzed syrup in glass cells at a temperature increasing from 125° F. to 200° F. over a 10-hour period followed by maintaining samples at 250° F. for three hours. The burning rate of the clear, water-white cast resin specimens is found to be 0.34" per minute by application of standard test No. D 757–49 of the American Society for Testing Materials.

A 0.093" thick two-ply laminate of excellent properties is prepared by saturating 2-ounce glass mat with the same liquid resin catalyzed with 1% of benzoyl peroxide and then curing the laminate for 20 minutes at 105° C. and 30 p. s. i. gage pressure. The Barcol hardness of this laminate is found to be 45. In order to demonstrate the self-extinguishing properties of this laminate, a test recommended by the Underwriters' Laboratories is carried out wherein the bottom inch of a 1" x 9" strip of the glass fill material is exposed at an angle of 45° to a Bunsen burner flame 5" long with an inner cone of 1½" length. After 30 seconds exposure, the Bunsen flame is removed, and the flame on the test strip extinguishes itself in 10 seconds.

Specimens of the above castings are exposed to intense ultraviolet radiation according to the procedure of A. S. T. M. standard test No. D 620–49 except that a different but constant intensity of radiation is employed. Weathering tests are performed in a standard Weatherometer employing an arbitrary but constant intensity of light radiation therein. The separate samples withstand 650 hours of exposure to the S–1 sunlamp and 1700 hours in the Weatherometer before there is a decrease of 10% in the reflectance in light of a wave length of 430-millimicrons. These figures indicate exceptional stability against yellowing as they are a striking improvement over those obtained in Comparative Example A with a halogen-free resinous composition. This result is highly unexpected in view of previous failures to stabilize halogen-containing polyester compositions against yellowing by the use of ultraviolet light absorbing agents.

*Comparative Example A*

Example 1 is repeated exactly save for the omission of dipropyl chloromethyl phosphonate from the liquid resin formulation. The burning rate of a cast sample is 0.70" per minute, and the laminate produced with this typical commercial resin continues to burn after removal of the Bunsen flame until it is entirely consumed. A 10% decrease in the specified reflectance is observed after 500 hours exposure to the S–1 sunlamp and after 800 hours in the Weatherometer.

EXAMPLE 2

Example 1 is duplicated in part using the same resin syrup except for the addition of 5 more parts of the phosphonate compound to furnish a total of 15 parts therein. Upon application of the standard flame extinction test, it is observed that the flame on the laminated test strip disappears 2 seconds after removal of the Bunsen flame. Separate cast samples withstand 740 hours of sunlamp radiation and 1500 hours of weathering in the Weatherometer, respectively, before the specified decrease in reflectance occurs.

EXAMPLE 3

A resin syrup is made up using:

| | Parts by weight |
|---|---|
| Unsaturated polyester resin of Ex. 1 | 60 |
| Styrene | 23 |
| Dipropyl chloromethyl phosphonate | 17 |
| 2 - hydroxy - 4 - methoxybenzophenone | 0.25 |
| Hydroquinone | 0.008 |

This liquid resin is catalyzed, laminated, cured and tested for self-extinguishing characteristics according to the procedure of Example 1. When the Bunsen flame is removed, it is found that the flame on the glass laminate is extinguished in 2 seconds.

EXAMPLE 4

Another resin syrup of the following formulation is prepared:

| | Parts by weight |
|---|---|
| Unsaturated polyester resin of Ex. 1 | 71 |
| Styrene | 29 |
| Dibutyl chloromethyl phosphonate | 11.3 |
| 2 - hydroxy - 4 - methoxybenzophenone | 0.25 |
| Hydroquinone | 0.008 |

Transparent, water-white castings of ⅛" thickness are made according to the procedure of Example 1 and found to have a burning rate of only 0.34" per minute by the specified test.

EXAMPLE 5

Another liquid resin is blended by thoroughly mixing the following ingredients:

| | Parts by weight |
|---|---|
| Unsaturated polyester resin of Ex. 1 | 71 |
| Styrene | 29 |
| Dioctyl chloromethyl phosphonate | 16.5 |
| 2 - hydroxy - 4 - methoxybenzophenone | 0.25 |
| Hydroquinone | 0.008 |

Castings catalyzed and cured as in Example 1 are clear and colorless. Upon application of the A. S. T. M. the burning rate is found to be 0.44" per minute.

EXAMPLE 6

A different unsaturated alkyd resin is obtained by reacting the following materials in conventional manner:

| | Mols |
|---|---|
| Ethylene glycol | 6.6 |
| Maleic anhydride | 5.0 |
| Alipic acid | 1.0 |

This was dissolved with mixing with the following proportions of other ingredients in forming the syrup:

| | Parts by weight |
|---|---|
| Unsaturated polyester resin | 80 |
| Monomeric diallyl phthalate | 20 |
| Methyl ethyl bromomethyl phosphonate | 5 |
| 2-hydroxy-4-methxybenzophenone | 0.25 |
| Hydroquinone | 0.02 |

Castings and laminates are prepared as before and found to have a satisfactorily low burning rate and to be self-extinguishing, respectively.

EXAMPLE 7

A polyester resin with a low degree of unsaturation is obtained by condensing:

| | Mols |
|---|---|
| Propylene glycol | 6.6 |
| Phthalic anhydride | 4.0 |
| Fumaric acid | 2.0 |

A suitable resin syrup contains:

| | Parts by weight |
|---|---|
| Unsaturated polyester resin | 62 |
| Styrene | 38 |
| Dioctadecyl bromomethyl phosphonate | 15 |
| Cobalt (in the form of cobalt naphthenate) | 0.004 |
| 2,2'-dihydroxy-4-methoxybenzophenone | 0.25 |
| Hydroquinone | 0.008 |

Using 2.0 parts of a 70% solution of methyl ethyl ketone peroxide in dimethyl phthalate as a catalyst, ⅛" thick castings are made in the same glass cells and a two-ply glass mat laminate is laid up under contact pressure; then all specimens are cured overnight at a room temperature of 22° C. These samples are not only self-extinguishing and have a satisfactorily low burning rate, but also appear to be more difficult to ignite in the Bunsen burner flame than conventional polyester laminates. Their initial color is excellent, and they display great resistance to discoloration from weathering and exposure to ultraviolet light.

EXAMPLE 8

A liquid resin syrup is made up and then cast and laminated in the identical manner as Example 1 except that 15 parts of dicresyl chloromethyl phosphonate, prepared from commercial cresol, is substituted in lieu of the smaller quantity of dipropyl chloromethyl phosphonate. The casting is found to have a burning rate of 0.34" per minute, and the laminate is self-extinguishing within a short interval when tested in the manner specified above.

EXAMPLE 9

A different alkyd resin is prepared in the usual fashion from the following reactants:

| | Mols |
|---|---|
| Diethylene glycol | 6.3 |
| Phthalic anhydride | 4.0 |
| Fumaric acid | 2.0 |

From this, a resin syrup is made up which contains:

| | Parts by weight |
|---|---|
| Unsaturated alkyd resin | 67 |
| Styrene | 33 |
| Dicyclohexyl dichloromethyl phosphonate | 20 |
| 2-hydroxy-5-salicylylbenzophenone | 0.25 |
| Hydroquinone | 0.008 |

Clear colorless castings and laminates are prepared in the manner indicated in Example 1. The glass laminates display excellent self-extinguishing characteristics. In addition to a low burning rate on a cast specimen, the samples are highly resistant to deterioration resulting from weather and exposure to sunlight.

EXAMPLE 10

A polyester resin containing combined phosphorus is condensed from:

| | Mols |
|---|---|
| Propylene glycol | 2.7 |
| 1,1' - isopropylidene - bis(p-phenylenoxy - di-2-propanol) | 1.0 |
| Maleic anyhdride | 3.7 |
| Triethyl phosphate | 0.017 |

A suitable resin syrup is prepared by blending the following materials:

| | Parts by weight |
|---|---|
| Unsaturated polyester resin | 45 |
| p-methyl styrene | 36 |
| o-methyl styrene | 19 |
| Diphenyl bromomethyl phosphonate | 10 |
| 2-hydroxy-4-methoxybenzophenone | 0.25 |
| Hydroquinone | 0.008 |

Castings and laminates are prepared from this liquid resin in the same manner as in Example 1. The transparent water-white products are found to have a high degree of flame resistance in combination with exceptional stability to yellowing upon prolonged exposure to weather and ultraviolet light.

While there are disclosed above only a limited number of the embodiments of the compositions of the invention herein presented, it is possible to produce still other embodiments without departing from the inventive concept herein disclosed, and it is desired, therefore, that only such limitations be imposed on the appended claims as are stated therein or required by the prior art.

We claim:

1. A composition of matter which comprises a polymerizable unsaturated linear polyester obtained by the esterification of an alpha, beta-ethylenically unsaturated polycarboxylic acid and a saturated dihydric alcohol, a copolymerizable monomer containing a $CH_2=C<$ group and having a boiling point of at least 60° C. and a phosphonate having the structural formula:

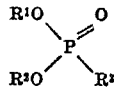

wherein $R^1$ and $R^2$ each represents a hydrocarbon radical selected from the group consisting of alkyl, cycloalkyl, aralkyl and aryl and $R^3$ is a radical of the group consisting of monohalogenated and dihalogenated methyl radicals.

2. A composition according to claim 1 in which the phosphonate comprises dimethyl chloromethyl phosphonate.

3. A composition according to claim 1 in which the phosphonate comprises diethyl chloromethyl phosphonate.

4. A composition according to claim 1 in which the phosphonate comprises dipropyl chloromethyl phosphonate.

5. A composition according to claim 1 containing between about 1 and about 40 parts by weight of the phosphonate per 100 parts of polymerizable matter therein.

6. A composition of matter according to claim 1 containing between about 5 and about 20 parts of dimethyl chloromethyl phosphonate per 100 parts of polymerizable matter therein.

7. A composition of matter according to claim 1 containing between about 5 and about 20 parts of diethyl chloromethyl phosphonate per 100 parts of polymerizable matter therein.

8. A composition of matter according to claim 1 containing between about 5 and about 20 parts of dipropyl chloromethyl phosphonate per 100 parts of polymerizable matter therein.

9. An insoluble, infusible, flame-retardant resinous product of the polymerization of a composition according to claim 1.

10. An insoluble, infusible, flame-retardant resinous product of the polymerization of a composition according to claim 1 which contains between about 1 and about 40 parts by weight of the phosphonate per 100 parts of polymerizable matter therein.

11. An insoluble, infusible, flame-retardant resinous product of the polymerization of a composition according to claim 1 containing between about 5 and about 20 parts by weight of dimethyl chloromethyl phosphonate per 100 parts of polymerizable matter therein.

12. An insoluble, infusible, flame-retardant resinous product of the polymerization of a composition according to claim 1 containing between about 5 and about 20 parts by weight of diethyl chloromethyl phosphonate per 100 parts of polymerizable matter therein.

13. An insoluble, infusible, flame-retardant resinous product of the polymerization of a composition according to claim 1 containing between about 5 and about 20 parts by weight of dipropyl chloromethyl phosphonate per 100 parts of polymerizable matter therein.

References Cited in the file of this patent

UNITED STATES PATENTS

| | | |
|---|---|---|
| 2,682,522 | Coover et al. | June 29, 1954 |
| 2,714,100 | Toy | July 26, 1955 |